(12) United States Patent
Abe et al.

(10) Patent No.: US 8,993,036 B2
(45) Date of Patent: Mar. 31, 2015

(54) METHOD FOR PRODUCING SOYBEANS HAVING REDUCED UREASE CONTENT

(75) Inventors: Kiyoko Abe, Osaka (JP); Katsushi Kawashima, Osaka (JP)

(73) Assignee: Otsuka Pharmaceutical Co., Ltd., Tokyo (JP)

(*) Notice: Subject to any disclaimer, the term of this patent is extended or adjusted under 35 U.S.C. 154(b) by 0 days.

(21) Appl. No.: 13/583,850

(22) PCT Filed: Mar. 11, 2011

(86) PCT No.: PCT/JP2011/055746
§ 371 (c)(1),
(2), (4) Date: Sep. 10, 2012

(87) PCT Pub. No.: WO2011/111814
PCT Pub. Date: Sep. 15, 2011

(65) Prior Publication Data
US 2013/0004647 A1    Jan. 3, 2013

(30) Foreign Application Priority Data
Mar. 12, 2010    (CN) .......................... 2010 1 0125194

(51) Int. Cl.
*A23L 1/211* (2006.01)
*A23L 1/20* (2006.01)

(52) U.S. Cl.
CPC ............. *A23L 1/2111* (2013.01); *A23L 1/2003* (2013.01)
USPC ............................ 426/634; 426/507; 426/455

(58) Field of Classification Search
CPC ....... A23L 1/20; A23L 1/2001; A23L 1/2003; B65B 7/00; A23V 2250/5488
USPC ......................................... 426/634, 507, 455
See application file for complete search history.

(56) References Cited

U.S. PATENT DOCUMENTS

| | | | | |
|---|---|---|---|---|
| 2,148,142 A | * | 2/1939 | Wait | 426/312 |
| 3,141,777 A | * | 7/1964 | Guidarelli et al. | 426/242 |
| 3,253,930 A | * | 5/1966 | Gould et al. | 426/457 |
| 3,519,441 A | * | 7/1970 | Ferrara et al. | 426/455 |
| 3,647,484 A | * | 3/1972 | Yokotsuka et al. | 426/18 |
| 3,708,310 A | * | 1/1973 | Kasakoff | 426/46 |
| 3,758,532 A | * | 9/1973 | Gibble | 554/191 |
| 4,113,892 A | * | 9/1978 | Shimizu et al. | 426/602 |
| 4,450,176 A | * | 5/1984 | Stahel | 426/2 |
| 4,496,599 A | * | 1/1985 | Steinkraus | 426/430 |
| 4,810,513 A | * | 3/1989 | Van Liere | 426/465 |
| 4,882,180 A | * | 11/1989 | Takao et al. | 426/46 |
| 6,146,669 A | * | 11/2000 | Jones et al. | 426/53 |
| 6,838,111 B2 | | 1/2005 | Nakano et al. | |
| 7,217,545 B2 | * | 5/2007 | Agblevor et al. | 435/139 |
| 8,153,174 B2 | * | 4/2012 | Hansen | 426/46 |
| 2005/0281938 A1 | * | 12/2005 | Harada | 426/615 |
| 2010/0086660 A1 | | 4/2010 | Takai et al. | |

FOREIGN PATENT DOCUMENTS

| | | | |
|---|---|---|---|
| CN | 1050125 A | | 3/1991 |
| CN | 1757291 A | | 4/2006 |
| CN | 101485423 A | | 7/2009 |
| JP | 62-011068 A | | 1/1987 |
| JP | 62-224251 A | | 10/1987 |
| JP | 2-154646 A | | 6/1990 |
| JP | 3-112458 A | | 5/1991 |
| JP | 7-308164 | * | 11/1995 |
| JP | 11-89532 | * | 4/1999 |
| JP | 57-110160 | * | 4/1999 |
| JP | 2000-253995 | * | 9/2000 |
| JP | 2002-125611 A | | 5/2002 |
| JP | 2002-262806 A | | 9/2002 |
| JP | 2002-306104 | * | 10/2002 |
| JP | 2004-141155 A | | 5/2004 |
| JP | 2007-082510 A | | 4/2007 |
| JP | 2009-095305 A | | 5/2009 |
| KR | 2004-102944 | * | 12/2004 |
| WO | WO8706800 | | 11/1987 |
| WO | 2004/060079 A1 | | 7/2004 |
| WO | 2008/081948 A1 | | 7/2008 |

OTHER PUBLICATIONS

Cromwell. Soybean Meal—An Exceptional Protein Source. No date given. http://www.soymeal.org/ReviewPapers/SBMExceptionalProteinSource.pdf.*
English Translation for Detailed Description of JP 2000-253995 published Sep. 2000.*
Edamame. 2006. http://www.vegelicious.com/recipes/edamame.html.*
Zhong Huayi et al., "Effect of heat treatment on anti-nutritive factors and nutritive value of soybean and soybean meal", Acta Zoonutrimenta Sinica, 1998, 10(1): 12-19.
Supplementary European Search Report issued in corresponding European Patent Application No. EP 11 75 3472.7, dated Sep. 23, 2013.
Office Action issued in Singapore Patent Application No. 201206161-0, dated Jun. 13, 2014.
De-Ying et al., "Effect of Wet Heat Treatment on Antinutritive Factors," Journal of Shandong Agriculture University (Natural Science), 2000, 31(2):166-168.

* cited by examiner

*Primary Examiner* — Anthony Weier
(74) *Attorney, Agent, or Firm* — Sughrue Mion, PLLC

(57) ABSTRACT

This invention relates to a processed soybean having a reduced urease content, the soybean being produced by decompressing and steaming, wherein the soybean is not ground soybean.

14 Claims, No Drawings

METHOD FOR PRODUCING SOYBEANS HAVING REDUCED UREASE CONTENT

CROSS REFERENCE TO RELATED APPLICATIONS

This application is a National Stage of International Application No. PCT/JP2011/055746 filed Mar. 11, 2011, claiming priority based on Chinese Patent Application No. 201010125194.X, filed Mar. 12, 2010, the contents of all of which are incorporated herein by reference in their entirety.

TECHNICAL FIELD

The present invention relates to a processed soybean having a reduced urease content, and a method of producing thereof.

BACKGROUND ART

Soybeans are called the meat of the field. They are rich in protein having an amino acid composition similar to that of animal protein, and contain good quality protein comparable to that of meat and eggs. Soybeans are also rich in oil (fat), and 50% or more thereof is linoleic acid, which functions to decrease blood cholesterol. Soybeans are known to be effective in preventing adult diseases, in particular, high blood pressure. Further, soybeans contain lecithin, and are known to be effective in preventing dementia by acting on brain cells.

Still further, soybeans contain nutrients such as vitamins, including vitamin B1, vitamin B2, vitamin E, vitamin K, etc.; calcium; potassium; fiber; etc. These nutrients are known to be effective in relieving fatigue and preventing aging, constipation, etc.

It has been reported that soybeans also contain various isoflavones having a mild female hormone-like action, and are effective in preventing or ameliorating menopausal symptoms, osteoporosis, etc.

As described above, soybeans contain various useful nutrients, and have been drawing attention as a non-meat food material with a high nutritional value and a good nutritional balance. In recent years, a technique for producing soybean powder having excellent texture and containing substantially all of the soybean nutrients has been developed (for example, Patent Literature 1 and Patent Literature 2). In response to the recent health consciousness of consumers, various food products and beverages that use the soybean powder have been attracting attention.

At the same time, soybeans contain urease, which is an enzyme that hydrolyzes urea and produces ammonia. When urease is taken into the body, it comes into contact with urea that exists in the intestinal tract, and ammonia is thereby formed. The ammonia thus formed is absorbed in the body, and the greatest part thereof is transformed into urea in the liver. However, patients who have liver disorders, such as cirrhosis of the liver, exhibit lowered ureagenesis in the liver. This results in the accumulation of ammonia in the body and the elevation of the ammonia levels in blood. The elevation of ammonia levels in the blood is believed to be a main cause of brain disorders, such as hepatic encephalopathy and hepatic comas. Urease is also known to facilitate the colonization of *Helicobacter Pylori*, which is a pathogenic bacterium that causes gastritis and gastric ulcers. Furthermore, the ammonia formed by urease is toxic to enterobacilli, resulting in the aggravation of intestinal bacterial flora.

In China, a fatal accident was caused by a trypsin inhibitor contained in soybean. In response, national standards were established for soybean powder and soy milk. Since the trypsin inhibitor has almost the same enzyme inactivation temperature range as urease, the urease activity value is used as an indicator in the Chinese national standards that regulate the safety of soybean powder and soy milk.

As described above, it is important to prevent an excessive intake of a trypsin inhibitor and urease in order to maintain a healthy condition and prevent disease. Therefore, it is believed that food materials that are taken daily, such as soybeans, should desirably have a reduced urease activity.

The soybean powder disclosed in Patent Literature 1 is excellent in nutritional value, texture, flavor, and the like, and is free from any problems in terms of safety. However, in order to favorably respond to the recent and increasing health consciousness of consumers, the provision of a higher value-added soybean material is in demand.

CITATION LIST

Patent Literature

PTL 1: Japanese Unexamined Patent Publication No. 2004-141155
PTL 2: WO2004/060079

SUMMARY OF INVENTION

Technical Problem

An object of the present invention is to provide a processed soybean having an excellent texture and flavor with a reduced urease content. Preferably, the present invention aims to provide a processed soybean with uniformly reduced urease content.

Solution to Problem

The present inventors conducted intensive studies in an attempt to solve the above-described problems and found that when a soybean is heated by steaming or the like under atmospheric pressure, the urease content of soybean cannot be reduced satisfactorily or the residual urease content remarkably varies between each soybean. In order to solve these problems, the present inventors constantly repeated intensive studies and found that the urease content can be uniformly and satisfactorily reduced by steaming soybeans after decompressing them. The present inventors conducted further studies and found that the raw soybean taste can also be reduced and the sweetness can be favorably drawn out. The present invention has been accomplished based on these findings.

More specifically, the present invention provides the inventions described below.

Item 1. A method for producing a processed soybean comprising steps (A) and (B):
(A) decompressing a soybean; and
(B) steaming the soybean obtained in step (A).

Item 2. The method according to Item 1, wherein the decompressing is conducted by exposing the soybean to a reduced pressure of 30 kPa or less.

Item 3. The method according to Item 1 or 2, wherein the steaming is performed at 80 to 150° C. over a period of 1 to 60 minutes.

Item 4. The method according to any one of Items 1 to 3, wherein the processed soybean that has undergone steaming is further subjected to drying and/or pulverization.

Item 5. A processed soybean obtainable by any one of the methods according to Items 1 to 4.

Item 6. The processed soybean according to Item 5, which has the urease activity of pseudopositive (+1) or less measured based on Chinese national standard GB/T5413.31-1997.

Item 7. A method for producing a processed soybean comprising:
decompressing and then steaming a soybean.

Item 8. The method for producing a processed soybean according to Item 7, wherein the decompressing is conducted by exposing the soybean to a decompressed atmosphere of 10 kPa or less.

Item 9. The method for producing a processed soybean according to Item 1 or 2, wherein the soybean that has undergone the decompressing is heated at 30 to 100° C. for more than one minute after the decompressing and prior to the steaming.

Item 10. The method for producing a processed soybean according to any one of Items 7 to 9, wherein the steaming is performed at 80 to 150° C. for 1 to 60 minutes.

Item 11. The method for producing a processed soybean according to any one of Items 7 to 10, wherein the processed soybean that has undergone the steaming is subjected to drying and/or pulverization.

Item 12. A processed soybean having an urease activity of pseudopositive (+1) or less measured based on Chinese national standard GB/T5413.31-1997.

Item 13. A processed soybean obtainable by any one of the methods according to Items 7 to 11.

Advantageous Effects of Invention

The present invention can provide a processed soybean having a uniformly reduced urease content without unevenness attributable to the variance in types of soybeans, grain size, shape, hardness and the like or unevenness attributable to the portions of soybeans used (such as the cotyledon and hypocotyl). The processed soybean excels in safety because its urease content is uniformly reduced. Furthermore, the processed soybean has a reduced raw taste and favorable sweetness, and nonuniformity in terms of such characteristics is also reduced. Therefore, the present invention can provide a processed soybean that is safe, has favorable taste and uniform quality. The processed soybean is usable as a material for foods and beverages; therefore, by adding the processed soybean of the present invention to various foods and beverages, processed soybean-containing foods and beverages with a reduced urease content can be provided.

DESCRIPTION OF EMBODIMENTS

1. Method for Producing Processed Soybeans

The method for producing the processed soybeans of the present invention is characterized in that processed soybeans are obtained by subjecting raw soybeans to decompression and then to steaming. The production method of the present invention is described in detail below.

There is no limitation to the raw material soybeans (soybeans) in terms of their variety or origin. The raw material soybeans may be those that were subjected to careful selection in order to remove halved beans, crushed beans, worm-eaten beans, other seeds, contaminants, etc. The raw soybeans may be subjected to washing, such as water washing or the like, in order to remove dust, dirt, etc., attached to the surface of the soybeans.

The raw material soybeans generally used in the present invention are those subjected to dehulling using an appropriate dehulling apparatus, auxiliary dehulling apparatus, etc., according to a conventional method. The dehulling is not particularly limited and, for example, a soybean whose hull was removed by heating may be used as a raw material soybean. Therefore, the raw material soybeans may be raw soybeans or soybeans heated to such an extent that the inside thereof is not roasted. In one embodiment, the raw material soybean is preferably a soybean whose inside is not completely roasted, and more preferably a raw soybean. Note that, in dehulling, it is preferable to separate the hull of the soybean while minimizing mechanical damage, such as cracking, breaking, etc., to the cotyledon, because when the cells of the leaves are physically damaged, enzymes act on soybean oil, giving the soybean a strong raw taste.

In the present invention, decompression is performed by exposing the raw material soybeans to a decompressed atmosphere. By performing the decompression, the raw material soybeans will have improved thermal conductivity in the subsequent steaming, thereby allowing the soybeans to be uniformly steamed. This eliminates unevenness in steaming between soybean grains or between soybean portions, to obtain processed soybeans with uniformly reduced urease content and improved flavor.

There is no particular limitation to the pressure conditions under which the decompression is conducted. The decompression is conducted under a pressure of generally 30 kPa or lower, preferably 10 kPa or lower, and more preferably 1 to 10 kPa, and yet more preferably 3 to 7 kPa.

The decompression time is not particularly limited as long as the urease content of the soybeans can be uniformly reduced, and is generally 1 minute or more, preferably 1 to 10 minutes, and more preferably 3 to 7 minutes. The temperature for the steaming is not particularly limited, and is, for example, −20 to 45° C. and preferably room temperature.

Soybeans that have undergone the decompression are subsequently supplied to the steaming described below after their atmosphere has been returned to ordinary pressure. In the process of steaming after decompression, it is preferable to prevent air from entering the atmosphere of soybeans that have undergone decompression as much as possible. Therefore, in the present invention, the atmosphere is preferably returned to ordinary pressure from a reduced pressure by introducing water vapor to the atmosphere of the soybeans that have undergone decompression.

Prior to steaming, the soybeans that have undergone decompression may be supplied to a preliminary heating step. By conducting preliminary heating, more uniform steaming, i.e., steaming that is free from unevenness, can be conducted in the steaming described below. The preliminary heating may be started after returning the pressure of the atmosphere of the soybeans to ordinary pressure after decompression. Alternatively, it may be started by introducing heated water vapor while returning the pressure of the atmosphere of the soybeans to ordinary pressure after decompression.

The temperature of the preliminary heating is not particularly limited insofar as it does not adversely affect the excellent sensory-related properties and texture, and is, for example, 30 to 100° C., preferably 70 to 90° C., and more preferably 75 to 85° C. The period of time for the preliminary heating may be suitably selected as long as the temperature evenly spreads through all of the soybeans, and is, for example, 1 minute or more, preferably 1 to 20 minutes, and more preferably 5 to 15 minutes. Generally speaking, when preliminary heating is performed at a relatively low temperature, the preliminary heating is desirably performed for a relatively long period of time. In contrast, when preliminary heating is performed at a relatively high temperature, the preliminary heating is desirably performed for a relatively short period of time.

The heating is preferably conducted by the introduction of heated water vapor.

Subsequently, the soybeans are steamed in the present invention. By steaming the soybeans, the urease content in the soybeans can be reduced while maintaining an excellent texture and flavor free from a raw taste and the like. The steaming may be conducted by contacting the soybeans with water vapor under predetermined temperature conditions according to a known method. The steaming conditions are, for example, 80 to 150° C. for 1 to 60 minutes, preferably 90 to 130° C. for 5 to 50 minutes, and more preferably 100 to 130° C. for 5 to 35 minutes. When the steaming temperature is unduly low, urease deactivation cannot satisfactorily proceed, unfavorable raw taste remains in soybeans, and sweetness cannot be sufficiently drawn out. The steaming is preferably performed at a high temperature in order to deactivate the urease activity, and remove the raw taste from soybeans. However, in order to also draw out the sweetness of the soybeans, the steaming is preferably performed within the temperature range described above.

Generally, when the steaming is performed at a relatively low temperature, the steaming is preferably performed for a relatively long period of time. When the steaming is performed at a relatively high temperature, the steaming is preferably performed for a relatively short period of time. By properly balancing the steaming temperature and steaming time, the sweetness of the soybeans can be drawn out while satisfactorily reducing the urease content and raw taste. For example, when the steaming is performed at 80 to 100° C., the steaming is preferably performed for 20 to 60 minutes, more preferably for 25 to 55 minutes, and even more preferably for 30 to 50 minutes. When the steaming is performed at 130 to 150° C., the steaming is preferably performed for 1 to 30 minutes, more preferably for 2 to 20 minute, and even more preferably for 3 to 15 minutes.

The processed soybeans may be cooled naturally after steaming. Alternatively, the temperature of the processed soybeans may be lowered by reducing the pressure to about 1 to 10 kPa after steaming. When the pressure is reduced to about 1 to 10 kPa after steaming, not only can the temperature of the steam-treated soybeans be lowered but also the water content thereof can be reduced by 2 to 3 wt % by evaporating the moisture on the surface of the processed soybeans. This is preferable because it can advantageously simplify the entire production process.

It is preferable that the decompression, the preliminary heating optionally performed as needed, and the steaming be sequentially conducted using a single device, i.e., a steaming apparatus that can control pressure and temperature.

The preservation stability and applicability as a food material of the processed soybeans obtained by steaming can be increased by drying them to remove the moisture contained therein. The method employed in the drying may be a known one, such as vacuum drying, air drying, hot-air drying, or heat drying. From the viewpoint of maintaining excellent texture and flavor, hot-air drying is preferable. The drying is preferably conducted in such a manner that the water content of the processed soybeans becomes about 6 wt % or less.

Further, the processed soybeans may be formed into a desirable shape by shaping them, such as cutting them into fine pieces, pulverizing them, or the like. Among these, processed soybean powder is preferable as it is highly applicable to general purposes due to the fact that it can be readily added to various foods and beverages. The processed soybeans can be pulverized by using various grinding apparatuses used for pulverization in the art. Examples of grinding apparatuses include an air grinder, a pin mill, a roll mill, a hammer mill, a mortar mill, and the like. When the processed soybeans are pulverized, the mean particle diameter is about 10 to 100 μm, and preferably about 10 to 50 μm. The mean particle diameter is measured by a laser diffraction/scattering particle size distribution analysis.

When the processed soybeans are shaped, such as being cut into fine pieces or pulverized, the shaping may be performed either prior to or after the drying step, or both prior to and after the drying step. In order to simplify the shaping procedure, the procedure is preferably conducted after the steaming and drying steps. One example of a method for shaping prior to and after drying is to press the processed soybeans flat into flakes with a roll, then supply them to a drying step, and ultimately pulverize them using an air grinder or the like.

2. Processed Soybeans

The processed soybeans thus obtained are free from a raw taste and the like, have an excellent texture, flavor, and a reduced urease content. In this specification, the term "a reduced urease content" means that the remaining urease activity in the processed soybean is reduced. More specifically, the processed soybeans obtained by this method have an urease content of preferably pseudopositive (+1) or less, and more preferably negative. Such processed soybeans have advantageous properties as compared to conventionally known processed soybeans. Here, positive, pseudopositive, and negative, which are the criteria for the urease content, are measured based on Chinese national standard GB/T5413.31-1997. Specifically, the urease content is measured according to the method disclosed in Test Example 1.

The processed soybeans of the present invention have quality (in particular, urease content) with reduced unevenness between each processed soybean. Here, the expression "reduced unevenness" means that when the entire amount of the soybeans supplied to the steaming step is defined as 100% (on a mass basis), the proportion of processed soybeans having an urease content of positive (+2) or higher is 30% or less, preferably less than 20%, more preferably less than 15%, still more preferably less than 10%, and yet more preferably less than 5%. In another preferable embodiment, when the entire amount of the soybeans supplied to the steaming step is defined as 100% (on a mass basis), the proportion of processed soybeans having an urease content of pseudopositive (−1) or higher is 30% or less, preferably less than 20%, more preferably less than 15%, still more preferably less than 10%, and yet more preferably less than 5%.

Note that, a processed soybean having a uniform urease content indicates that the soybeans were uniformly steamed; therefore, this also indicates that the processed soybeans have uniform characteristics in terms of raw taste, sweetness and like flavors. As described above, the present invention provides a novel processed soybean having a reduced urease content.

The processed soybeans described above are excellent in texture and flavor; therefore, they are applicable as a food material to various foods and beverages. The shape of the processed soybeans is suitably selected depending on the forms of the foods or beverages to which the processed soybeans are added. For example, when they are added to a food, the processed soybeans may be either a powder or granular form, and may be suitably selected depending on the type of food. When they are added to a beverage, the processed soybeans are preferably in a powder form in order to maintain excellent dispersion in the beverage.

Examples of foods to which the processed soybeans may be added include tofu-like foods, breads, baked confectioneries, beverages, gelatin-like foods, ice desserts, and the like. More specifically, the baked confectioneries to which the processed soybeans are added can be produced by shaping dough containing processed soybean powder into a desirable shape and baking it. Furthermore, the tofu-like foods to which the processed soybeans are added can be produced by using, instead of the soy milk that is used in the conventional method for producing tofu, a soybean liquid obtained by dissolving and dispersing the processed soybean powder in water. The tofu-like foods have the same appearance as that of tofu but because they contain the components of bean curd refuse (i.e., dietary fiber is not removed), they are not applicable to "tofu" as defined by the notification provided by the Commissioner of the Food and Marketing Bureau, Ministry of Agriculture, Forestry, and Fisheries, and for this reason, they are referred to as tofu-like foods in this specification.

When the processed soybeans are added to food, the proportion of the processed soybeans may be suitably selected depending on the form of the food and the like. The proportion thereof is, for example, 1 to 75 wt %, and preferably 5 to 35 wt %.

When the processed soybeans are added to a beverage, the proportion of the processed soybeans may be suitably selected depending on the type of beverage. The proportion thereof is, for example, 1 to 40 wt %, and preferably 5 to 35 wt %. A beverage containing the processed soybeans is provided as a soybean beverage.

In addition to containing the processed soybeans, the beverage may suitably contain, as necessary, a pH adjuster and a buffer (sodium bicarbonate, trisodium citrate, citric acid, sulfuric acid, or the like). Various flavors, flavoring materials, sweeteners, and the like, may also be added thereto in the same manner as for ordinary beverages.

In the production of the above-described beverage, a mixruew containing the processed soybeans and other ingredients as needed, in water is preferably homogenized. The homogenization results in a soybean beverage having a more excellent texture, in particular, a smooth texture. The homogenization can be performed using a general homogenizer. Specifically, the homogenization is performed using a high-pressure homogenizer (LAB40) manufactured by Gaulin, under the conditions of about 200 to 1,000 kgf/cm$^2$, preferably about 300 to 800 kgf/cm$^2$.

The soybean beverage thus obtained is suitably sterilized or pasteurized according to a known method. Thereafter, the soybean beverage is aseptically poured into a desirable container, giving a final product.

EXAMPLES

The present invention is described below in detail with reference to Examples. However, the scope of the invention is not limited to these Examples.

A. Preparation of Processed Soybeans

A processed soybean powder was prepared by the procedure described below.

1. Dehulling of Raw Material Soybeans (Raw Soybeans)

Soybeans from which pebbles and like contaminants were removed by sorting were used as the raw material soybeans. Subsequently, dehulled soybeans were obtained by removing the hull of the soybeans using an appropriate dehulling apparatus or an auxiliary dehulling apparatus (manufactured by Harada Corporation), and the dehulled soybeans were then cut into halves to obtain halved beans.

2. Decompression 5 kg of the halved beans obtained as described above were placed in a steam machine (manufactured by Shinagawa Machinery Works Co, Ltd., SRB-H-100 autoclave) in which the pressure was controllable. Decompression was conducted using a vacuum cooler (manufactured by Shinagawa Machinery Works Co., Ltd., model name: FCD) until the pressure of the atmosphere surrounding the soybeans became that of each sample as shown in Tables 1 and 2 below, and that pressure was maintained for 5 minutes.

3. Preliminary Heating

After the decompression was completed, water vapor was gradually introduced into the steam machine over a period of about 3 minutes to return the pressure inside the steam machine to ordinary pressure. Thereafter, the halved beans that have undergone the decompression were heated (by introducing heated water vapor) in the steam machine at 80° C. for 10 minutes.

4. Steaming

After the heating, water vapor was continuously introduced into the steam machine and steaming was conducted according to the temperature and time duration set for each sample as shown in Tables 1 and 2 below. After the steaming, the pressure of the atmosphere in the steam machine was reduced to 5 kPa and maintained until the temperature of the processed soybeans that have undergone steaming became 60° C. to dry the surface of the processed soybeans. The pressure in the steam machine was then returned to ordinary pressure, and the processed soybeans were collected.

5. Drying

The processed soybeans thus obtained were thinly and uniformly spread on a mesh pan, and placed in a box-type hot air dryer (manufactured by K.K. Yamato, DN-61 hot-air dryer) with the temperature set to 80° C., and dried until the water content thereof became 6 wt % or less. After drying, the processed soybeans were cooled to 30° C. or lower.

6. Pulverization

Using an air grinder, the processed soybeans that were collected after drying were pulverized. Pulverization continued until the mean particle diameter became 20 to 50 µm. The mean particle diameter was measured using a laser diffraction/scattering particle size distribution analyzer (LA-750, manufactured by Horiba, Ltd.).

B. Evaluation of Processed Soybeans

The processed soybean powders obtained above were measured and evaluated in terms of their urease activity, uniformity, sweetness, and raw taste as described below.

Measurement of Urease Activity 0.1 g of processed soybeans and 1 mL of water were placed in a 10-mL color comparison tube, and thoroughly mixed. Subsequently, 1 mL of a neutral buffer (containing 5.79 mg/mL of disodium hydrogenphosphate and 3.53 mg/mL of dipotassium hydrogenphosphate, pH 7) was added thereto, and 1 mL of urea solution (containing 10 mg/mL of urea, remainder: water) was further added thereto, followed by incubation at 40° C. for 20 minutes. Thereafter, 4 mL of water, 1 mL of sodium tungstate solution (containing 100 mg/mL of sodium tungstate, remainder: water), and 1 mL of sulfuric acid solution (containing 0.5 volume % of sulfuric acid, remainder: water) were added and mixed in this order, and the resulting mixture was subjected to filtration using filter paper (No. 5A) to collect the filtrate.

Subsequently, 2 mL of the filtrate thus obtained was placed in a 25-mL color comparison tube, and 15 mL of water, 1 mL of potassium-sodium-tartrate solution (containing 20 mg/mL of (+)-potassium-sodium-tartrate tetrahydrate (Rochelle salt), remainder: water), 2 mL of Na's Reagent (containing 55 mg/mL of mercury iodide (II) (red), 41.25 mg/mL of potassium iodide, 2 mL of (144 mg/mL sodium hydroxide, remainder: water), and enough water to make the total amount 25 mL were added.

The color of each sample after the treatment was observed and evaluated based on the following criteria.

Evaluation Criteria
Positive (+4) Liquid having a brick-like color turbidity or transparent upper layer
Positive (+3) Liquid having an orange transparent upper layer
Positive (+2) Deep gold or yellow transparent liquid
Pseudopositive (+1) Liquid having a pale yellow or slightly yellow upper layer.
Negative (−) Almost the same color or a lighter color than that obtained in control test tube[#1]
1 In the control test tube, the urease activity was evaluated using 0.1 g of water instead of 0.1 g of processed soybeans.

Uniformity
5 to 10 g of soybeans were extracted from each processed soybean sample at random, and the residual urease activity thereof was measured and the variances of the results were evaluated based on the following criteria.
5: All soybeans in the sample have negative urease activity.
4: Soybeans having an urease activity of pseudopositive or more are contained with a probability of 20% or less.
3: Soybeans having an urease activity of pseudopositive or more are contained with a probability of 20% (exclusive) to 40% (inclusive).
2: Soybeans having an urease activity of pseudopositive or more are contained with a probability of 40% (exclusive) to 60% (inclusive).
1: Soybeans having an urease activity of pseudopositive or more are contained with a probability of 60% (exclusive) to 80% (inclusive).

Average Residual Urease Activity
5 to 10 g of soybeans were extracted from each processed soybean sample at random, and the residual urease activity thereof was measured by the method described above. The levels of the measured residual urease activity were converted into the points shown below, and the average points of each treatment condition were calculated.
Positive (+4): 5 points
Positive (+3): 4 points
Positive (+2): 3 points
Pseudopositive (+1): 2 points
Negative (−): 1 point The calculated average values are evaluated based on the following criteria.
5: Average value of 1 (i.e., all processed soybeans measured had negative residual urease activity)
4: Average value greater than 1 but not exceeding 2.
3: Average value greater than 2 but not exceeding 3.
2: Average value greater than 3 but not exceeding 4.
1: Average value greater than 4 but not exceeding 5.

Sweetness Measurement
Five panelists were asked to taste the processed soybeans, and to evaluate the sweetness thereof by a grading system based on the following criteria. The results show the average of the points given by the panelists.
Grade
5: very sweet
4: Sweet
3: Slightly sweet
2: Faintly sweet
1: Not sweet Raw Taste Measurement
Five panelists were asked to taste the processed soybeans, and to evaluate the intensity of the raw taste thereof based on the following criteria. The results show the average of the points given by the panelists.
Grade
5: No raw taste
4: A faintly raw taste
3: A slightly raw taste
2: A strong raw taste
1: A very strong raw taste Test 1: Influence of Decompression Condition
The influence on the resulting processed soybeans was examined by changing only the decompression condition within the range of 5 to 100 kPa as shown in Table 1 below. Table 1 shows the results.

| | Decompression condition | Steaming conditions | Sweetness | Raw taste reduction | Uniformity | Average residual urease activity |
|---|---|---|---|---|---|---|
| Sample 1-1 | 5 kPa | 110° C., 25 minutes | 4 | 5 | 5 | 5 |
| Sample 1-2 | 10 kPa | 110° C., 25 minutes | 3 | 5 | 5 | 5 |
| Sample 1-3 | 30 kPa | 110° C., 25 minutes | 3 | 5 | 4 | 5 |
| Sample 1-4 | 50 kPa | 110° C., 25 minutes | 2 | 4 | 2 | 3 |
| Sample 1-5 | 100 kPa (atmospheric pressure) | 110° C., 25 minutes | 2 | 4 | 1 | 2 |

As is evident from the results of Table 1, by decompressing the soybeans before steaming them, a lack of uniformity in the urease activity remaining in the processed soybeans can be remarkably reduced. The results indicate that the aforesaid effect becomes more remarkable when decompression is performed at a pressure of 30 kPa or less. It also became clear that the residual urease content (i.e., urease activity) can be remarkably reduced by preliminary decompressing them. Furthermore, the addition of a decompressing step not only affects the urease content but also increases the sweetness of the processed soybeans and accordingly reduces the raw taste.

It is believed that the reduction of urease content and the improvement in taste were achieved by the fact that the thermal conductivity of the soybeans as a whole was improved, and uniform heating was made possible during the steaming by conducting decompression prior to steaming. Note that when decompression was not conducted prior to steaming, nonuniform heating of the soybeans was observed during steaming, and the urease content was not satisfactorily reduced.

Test 2: Influence of Steaming Conditions

As shown in Table 2 below, the raw taste and residual urease activity of soybeans processed by changing the steaming conditions were measured. Table 2 shows the steaming conditions together with the results.

TABLE 2

|  | Decompression condition | Steaming conditions | Raw taste reduction | Urease activity |
|---|---|---|---|---|
| Sample 2-1 | 10 kPa | 115° C., 25 minutes | 5 | — |
| Sample 2-2 | 10 kPa | 110° C., 25 minutes | 5 | — |
| Sample 2-3 | 10 kPa | 110° C., 61 minutes | 5 | — |
| Sample 2-4 | 10 kPa | 75° C., 25 minutes | 1 | +4 |
| Sample 2-5 | 10 kPa | 151° C., 25 minutes | 5 | — |
| Sample 2-6 | 10 kPa | 75° C., 61 minutes | 2 | +4 |

As is clear from the results of Table 2, when the steaming temperature is 75° C. or less, the raw taste and urease activity of the soybeans cannot be satisfactorily reduced even when the steaming time is extended. The results also clarify that having a high steaming temperature (sample 2-5) does not affect the function of reducing urease activity (i.e., residual urease content) and removing a raw taste.

The invention claimed is:

1. A method for producing a processed soybean comprising steps (A) to (C):
   (A) decompressing a soybean, wherein the soybean is not ground soybean;
   (B) returning the soybean to an ordinary atmospheric pressure; and
   (C) steaming the soybean obtained in step (B), wherein the steaming is performed at a temperature of 100 to 130° C.

2. The method according to claim 1, wherein the decompressing is conducted by exposing the soybean to a reduced pressure of 30 kPa or less.

3. The method according to claim 1, wherein the steaming is performed over a period of 1 to 60 minutes.

4. The method according to claim 1, wherein a processed soybean that has undergone steaming is further subjected to drying and/or pulverization.

5. A processed soybean obtainable by the method according to claim 1.

6. The processed soybean according to claim 5, which has urease activity of pseudopositive (+1) or less measured based on Chinese national standard GB/T5413.31-1997.

7. A method for producing a processed soybean, comprising steps (A) and (B):
   (A) decompressing a soybean, wherein the soybean is not ground soybean; and
   (B) steaming the soybean obtained in step (A), wherein the steaming is performed at a temperature of 100 to 130° C. for 5 to 35 minutes.

8. The method according to claim 7, wherein the decompressing is conducted by exposing the soybean to a reduced pressure of 30 kPa or less.

9. The method according to claim 7, wherein a processed soybean that has undergone steaming is further subjected to drying and/or pulverization.

10. A processed soybean obtainable by the method according to claim 7.

11. The processed soybean according to claim 10, which has urease activity of pseudopositive (+1) or less measured based on Chinese national standard GB/T5413.31-1997.

12. The method of claim 1, wherein in step (B), the soybean is returned to an ordinary atmospheric pressure by introducing heated water vapor.

13. The method of claim 7, wherein prior to the steaming of step (B), said decompressed soybean is returned to an ordinary atmospheric pressure.

14. The method of claim 13, wherein said decompressed soybean is returned to an ordinary atmospheric pressure by introducing heated water vapor.

* * * * *

UNITED STATES PATENT AND TRADEMARK OFFICE
CERTIFICATE OF CORRECTION

Page 1 of 1

PATENT NO. : 8,993,036 B2
APPLICATION NO. : 13/583850
DATED : March 31, 2015
INVENTOR(S) : Kiyoko Abe and Katsushi Kawashima It is certified that error appears in the above-identified patent and that said Letters Patent is hereby corrected as shown below:

On the Title Page, Column 1, in item (30) Foreign Application Priority Data:

March 12, 2010 (CN)     201010125194 should be --

March 12, 2010 (CN)     201010125194.X

Signed and Sealed this
Fifteenth Day of December, 2015

Michelle K. Lee
*Director of the United States Patent and Trademark Office*